Dec. 3, 1929.  F. X. NOICHL ET AL  1,737,890
APPARATUS AND METHOD OF CONTROLLING ELECTRODES IN ELECTRIC FURNACES
Filed Feb. 19, 1929  3 Sheets-Sheet 3
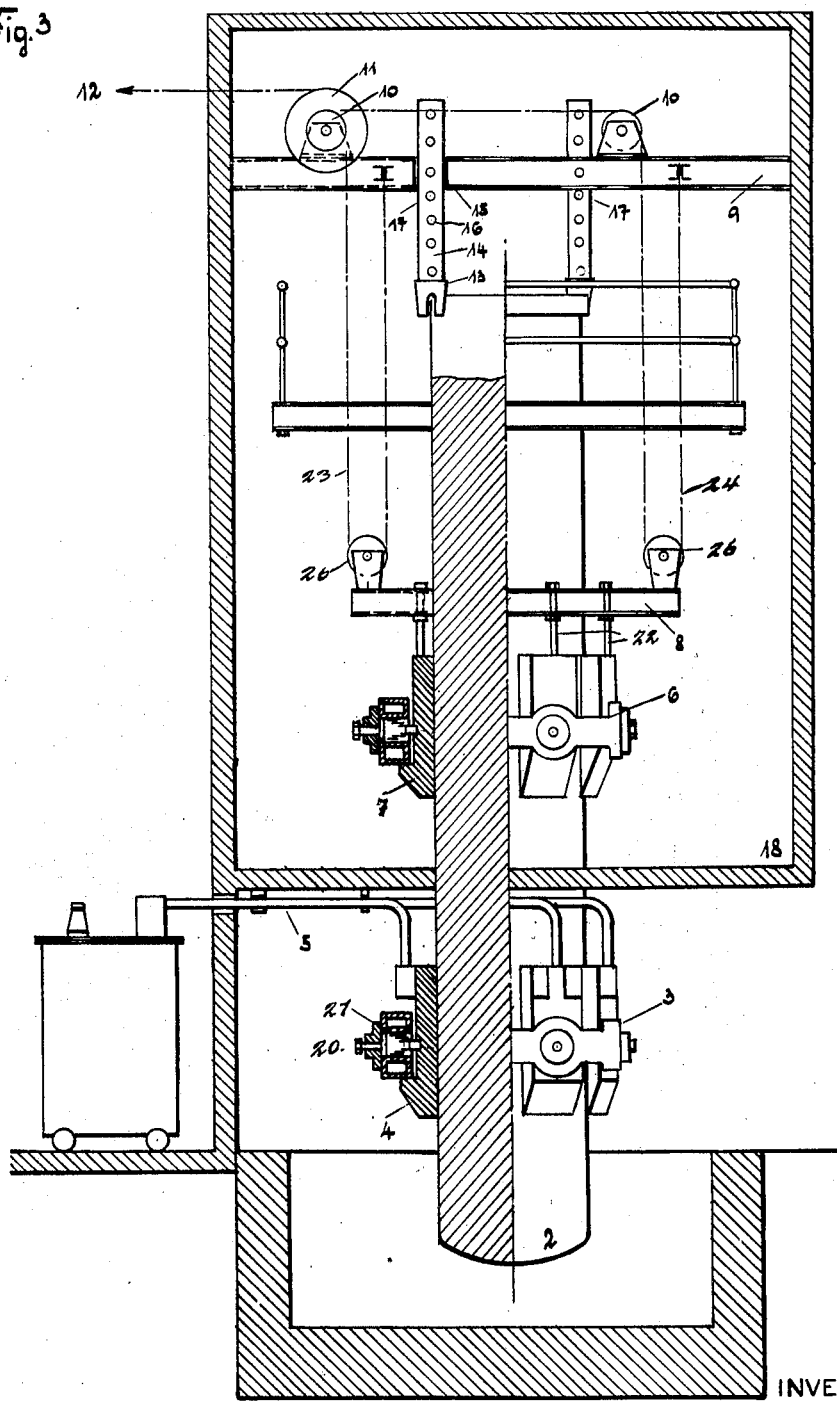

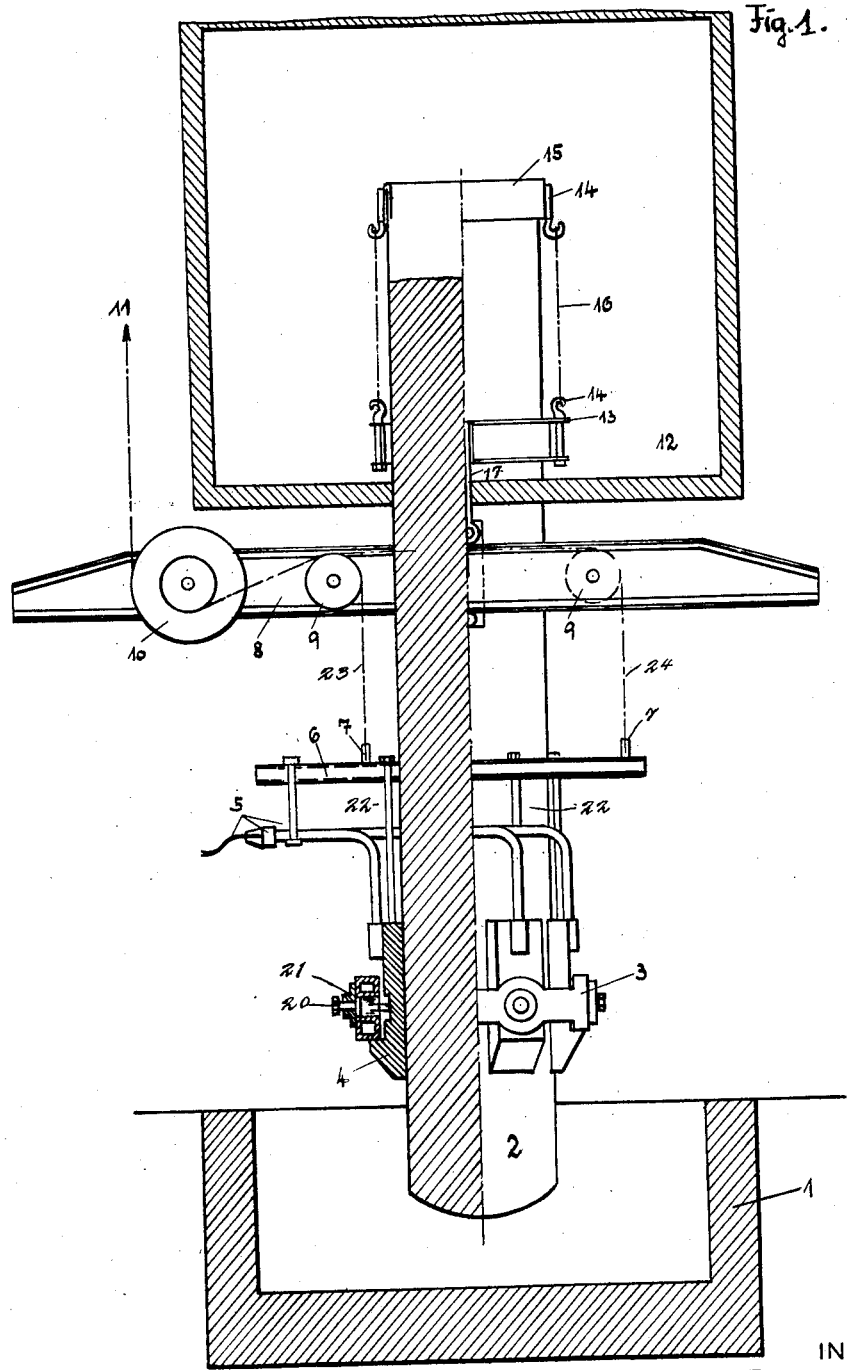

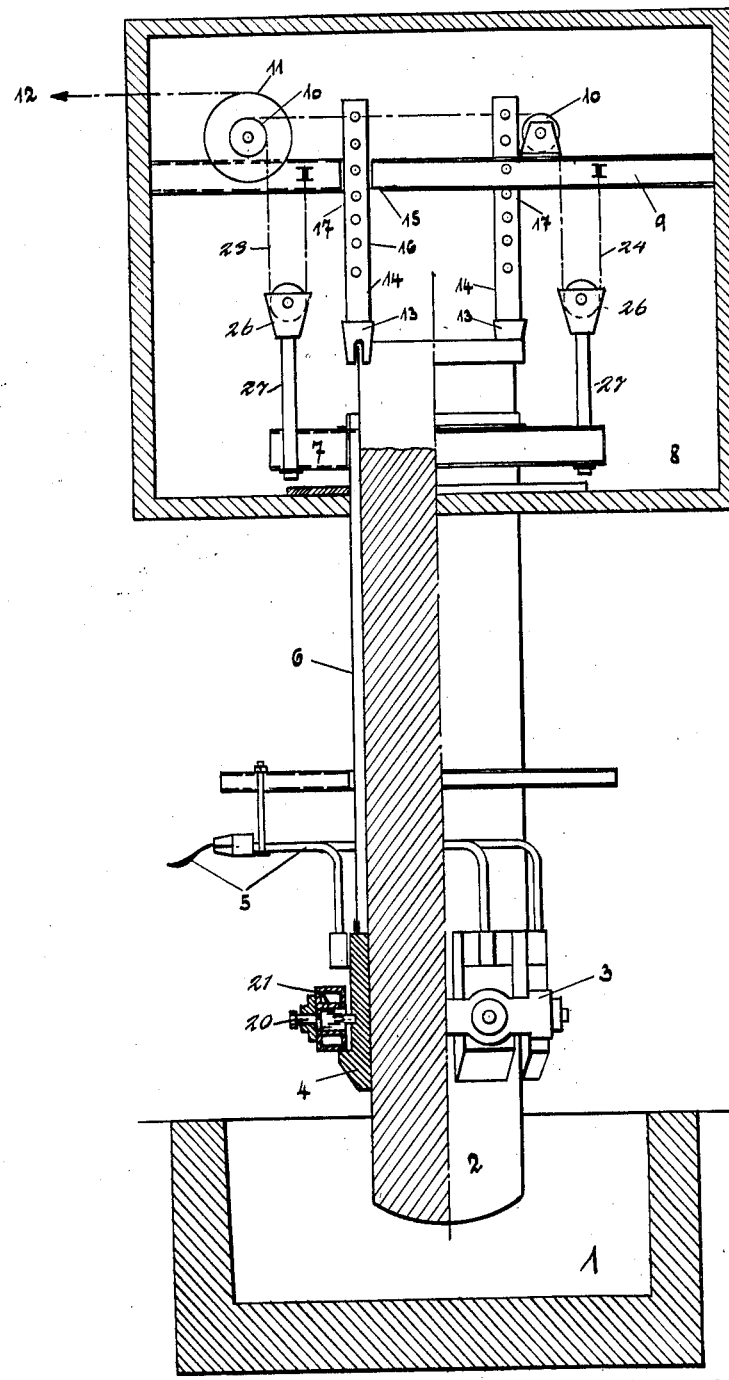

Patented Dec. 3, 1929

1,737,890

UNITED STATES PATENT OFFICE

FRANZ X. NOICHL AND ERNST SCHMIDT, OF BURGHAUSEN, IN OBERBAYERN, GERMANY, ASSIGNORS TO DR. ALEXANDER WACKER GESELLSCHAFT FÜR ELECTROCHEMISCHE INDUSTRIE, OF MUNICH, BAVARIA, GERMANY, A CORPORATION

APPARATUS AND METHOD OF CONTROLLING ELECTRODES IN ELECTRIC FURNACES

Application filed February 19, 1929, Serial No. 341,242, and in Germany April 27, 1927.

This invention relates to apparatus for and a method of controlling of electrodes in electric furnaces without interruption of the furnace operation.

In the electric furnaces heretofore used the electrodes are held in movable clamps which are moved to and from the bath as the position of the electrode projecting into the bath requires changing to meet various conditions. The part of the electrode in the bath becomes gradually used up until it is necessary to shift the position of the clamp further up the electrode to increase the length of the electrode below the clamp. This shifting is done by releasing the clamp and allowing the electrode to slide by gravity through it until the desired length of the electrode again projects below the clamp. By this method of releasing the pressure of the clamp it is inevitable that the current is diminished or cut off; further that the electrode is shifted in an incontrollable manner. This is particularly objectionable where uniform conditions in the furnace are necessary.

The present invention has for its object to provide an apparatus and method whereby the clamp can be moved along the electrode without disturbing or interrupting the furnace operation and without varying the pressure of the contact plates of the clamp against the electrode. A further object is to shift the clamp on the electrode by simple means, not involving complicated hydraulic or pneumatic devices which have heretofore been used in an attempt to solve this problem. A still further object is to provide an apparatus which does not depend on gravity for shifting the electrode and thereby is not limited in its use to furnaces only adapted for vertical electrodes.

In the accompanying drawings, Fig. 1 is a vertical section of one modification of the apparatus embodying the invention. Fig. 2 is a vertical section of another modification of the invention, the clamp structure being similar to that shown in Fig. 1. Fig. 3 is a vertical section of a third modification of the invention using two clamps.

Referring now to Fig. 1, the melting furnace 1 is provided with an opening through which electrode 2 is inserted. This electrode 2 is held in position by clamp 3 comprising contact plates 4 bearing yieldingly against the electrode 2. Pressure is exerted on the contact plates by means of threaded bolts 20 and springs 21 or any other conventional means of exerting a yielding pressure. Each of the contact plates 4 has attached thereto an electric cable 5 which leads to the source of electric energy to be used.

Circular frame 6, having its center cut out to allow the electrode 2 to pass through, is held in rigid relation to clamp 3 by bolts 22. This frame 6 is connected to any suitable elevating means such as the reel 10 by means of ropes 23 and 24 attached to insulators 7 mounted on frame 8. The ropes are passed over guide roll 9 and wound on reel 10, both journaled in stationary horizontal beam 8. The reel 10 is actuated by the rope 11 wound around an enlarged section of reel 10. Stationary box 12 is positioned above beam 8 and is provided with an opening in its bottom through which the electrode 2 is passed. Collar 13, surrounding and concentric to electrode 2 but not touching it, is held rigidly inside box 12 by upright bars 17 secured to beam 8. A cap 15 is mounted on the end of the electrode 2 projecting into box 12. Hooks 14 are provided on cap 15 and also on collar 13, each hook on cap 15 having a corresponding hook below it on collar 13 and being connected to said corresponding hook by chains 16. The chains 16 are normally lying aside. When the electrode is to be shifted, one of the links of every chain is fixed at the hooks 14 so that the electrode with its upper end 15 is anchored to the collar 13 with a very small free play. The effect of the chain will be more clearly understood upon reference to the description of the operation of the apparatus given below.

In operation, the electric current is supplied to the electrode 2 through the cables 5 and contact plates 4 whose pressure against the electrode remains constant during operation of the furnace. To raise or lower the electrode the reel 10 is revolved causing frame 6 and therefore clamp 3 to be moved. The electrode will normally move with the clamp 3; if the length of the electrode below the clamp is to be enlarged, the chains are fixed at the hooks as short as possible. If the clamps with the electrode is raised, the chains become taut, further movement of the electrode is prevented as the cap 15, being anchored to the stationary collar 13 by the taut rope 16 becomes an immovable abutment which the clamp 3 engages; the clamp 3 will slide up the electrode until the reel 10 is no longer turned. In this way the position of the clamp 3 on the electrode is shifted and the length of the electrode projecting below the clamp is increased. The clamp 3 and with it the electrode can be lowered, the chains become slack and may be removed without trouble. After this the normal working position is reached.

With this apparatus the shifting of the clamp is in no way dependent on gravity thereby distinguishing from the prior art devices which release the pressure of the clamp to allow the electrode to fall by gravity. The electrode in Fig. 1 could be horizontal or at any angle to the perpendicular and still the apparatus would function in the same way.

In the modification of the apparatus shown in Fig. 2, the furnace 1, electrode 2, clamp 3, contact plates 4 and cables 5 are all assembled as described in relation to Fig. 1. However, in place of bolts 22 being connected to movable framework 6 as in Fig. 1, the contact plates 4 are directly connected to a cylinder 6, on which is rigidly mounted framework 7, positioned inside of stationary box 8. The electrode 2 is held by clamp 3 and is passed through but does not contact with cylinder 6, the floor of box 8, and the framework 7 which has its center cut away for this purpose. Mounted on framework 7 are a pair of upright rods 27 supporting pulleys 26. The box 8 is stationary and has horizontal I-beam 9 secured therein. The framework 7 is raised and lowered by reel 11 around which are wound ropes 23 and 24 passing over their respective guide rolls 10, under their pulleys 26 and anchored on horizontal beam 9. Several shoes 13, at least three, situated regularly around the circumference, each carrying a vertical wooden rod 14, are mounted on the end of electrode 2 projecting into the chamber 8. Each of the rods 14 pass through a guide 15 provided in horizontal beam 9. To limit the upward movement on the electrode, the rods 14 are provided with perforations 16 into which are inserted pegs 17 which project beyond the guides 15 and thus engage the abutment formed by beam 9.

The operation of this modified form of the invention is similar to that shown in Fig. 1, except that the frame 7 and consequently the clamp 3, are elevated by the rope 12 wound around an enlarged section of reel 11, and that the movement of the electrode 2 is limited by pegs 17 engaging I-beam 9, when these pegs are inserted in the next perforations of the rods below I-beam 9. In normal working conditions the pegs are lying aside so that elevating and lowering of the clamp with the electrode are not disturbed. Further elevation of the clamp from such point results in a shifting of the clamp on the electrode.

The chains 16 in Fig. 1 and the pegs 17 in Fig. 2 have the same task. It must be possible to prevent the electrode from elevating when the hoist is winding up the frame 7. The electrode must not change its position in the furnace essentially so that the resistance of the system and therefore the current remain constant. For that reason, the pegs must be inserted in that particular perforation which is next below the I-beam 9.

When the operation of shifting is finished the clamp and the electrode will be lowered and the pegs removed. The electrode will get its normal possibility for moving.

In the modification of the invention shown in Fig. 3, the furnace 1, electrode 2, and clamp 3 comprising contact plates 4 are identical with those shown in the previous figures. But in this modification the clamp 3 is not connected with the elevating means and always remains in the same position with relation to furnace 1 and the pressure of the contact plates 4 is adjusted so that the current will flow freely to the electrode, but, on the other hand, so that electrode 2 may slide easily through the clamp 3. The clamp 3 is fixed by any supports (which are not designed) so that it cannot move and is remaining constantly in the same position.

A second clamp 6, similar to clamp 3, is positioned further up the electrode 2 inside of stationary box 18 through the floor of which the electrode is passed. Clamp 6 has no cables leading to its contact plates 7 and does not conduct electricity to the electrode. The pressure of contact plates 7 is made great enough to hold the electrode in position and normally to move the electrode when clamp 6 is moved. Movable frame 8, similar to frame 7 in Fig. 2, is rigidly secured to clamp 7 by means of bolts 22. The elevating means and means for limiting the movement of the electrode by having it engage and abutment are identical with those described and shown in Fig. 2.

The operation of this apparatus is identical with that of the apparatus shown in Fig. 2, but the functions of clamp 3 in Fig. 2 are divided between clamp 3 and clamp 6 in this apparatus. Clamp 3 functions only as a brush while clamp 6 functions only as a holder for the electrode 2. The advantage of this arrangement is that clamp 3 is not subjected to any movement which would tend to loosen the conduits 5 and need only be constructed to function as a brush while clamp 6, the elevating means and adjustable means engaging the abutment are all enclosed in box 18 and thereby protected from the heat in the furnace.

From the above description it will be seen that we have invented an apparatus and process which permits the shifting of the clamp on an electrode without the slightest variation in the current supplied to the electrode or any interruption in furnace operation and which requires only the simplest of mechanical parts.

The invention claimed is:

1. Apparatus for controlling electrodes in electric furnaces comprising in combination a furnace, an electrode adapted to be inserted in said furnace, a movable clamp yieldingly holding said electrode, abutment means to resist withdrawal of said electrode, and means for sliding said movable clamp on the electrode while it is held against said abutment means.

2. Apparatus for controlling electrodes in electric furnaces comprising in combination a furnace, an electrode adapted to be inserted in said furnace, a movable clamp yieldingly holding said electrode, abutment means to resist withdrawal of said electrode, adjustable means on said electrode engaging said abutment means, and means for sliding said movable clamp on the electrode while it is held against said abutment means.

3. Apparatus for controlling electrodes in electric furnaces comprising in combination a furnace, an electrode adapted to be inserted in said furnace, a movable clamp adapted to conduct electric current to said electrode and yieldingly holding said electrode, abutment means to resist withdrawal of said electrode, and means for sliding said movable clamp on the electrode while it is held against said abutment means.

4. Method of controlling electrodes in electric furnaces comprising placing abutment means against the outer end of an electrode to resist withdrawal of said electrode from the furnace and then sliding a clamp holding the electrode along said electrode.

5. Method of controlling electrodes in electric furnaces comprising placing abutment means against the outer end of an electrode to resist withdrawal of said electrode from the furnace and then sliding a clamp holding the electrode along said electrode, without diminishing the pressure of said clamp on the electrode.

Signed at Munich, Germany and State of Bavaria this 6th day of February A. D. 1929.

FRANZ X. NOICHL.
ERNST SCHMIDT.